United States Patent Office 2,728,802
Patented Dec. 27, 1955

2,728,802

CATALYTIC ALKYLATION PROCESS

Rex D. Closson, Detroit, Alfred J. Kolka, Birmingham, and Waldo B. Ligett, Pontiac, Mich., assignors to Ethyl Corporation, New York, N. Y., a corporation of Delaware No Drawing. Application April 29, 1952, Serial No. 285,074

9 Claims. (Cl. 260—668)

This invention relates to an alkylation process and more particularly to alkylation of the alkyl or cycloalkyl portion of certain carbocyclic compounds.

Alkylation of aromatic hydrocarbons has been carried out in the past chiefly with catalysts of the Friedel-Crafts type such as sulfuric acid, hydrogen fluoride, aluminum chloride, zinc chloride, and the like. This method suffers from the disadvantage that alkylation takes place preferentially on an aromatic nucleus and, furthermore, extensive rearrangement of the carbon skeleton of the alkylating molecule can take place. More recently a method of alkylating certain hydrocarbons using sodium as the catalyst has been proposed. In this case alkylation takes place on the side chain of an alkylaromatic hydrocarbon. However, the prior art teaches that only cyclic hydrocarbons having at least two hydrogens on a carbon which is directly attached by a single bond to a nuclear carbon atom which in turn is attached by a double bond to another nuclear carbon atom can be so alkylated. No provision is made, therefore, for alkylation on the side chain of compounds having only one hydrogen on the carbon which is directly attached to a doubly bonded nuclear carbon atom as exemplified by compounds such as isopropylbenzene, sec-butylbenzene and the like. Still more recently a method of alkylating certain hydrocarbons using organo-alkali metal compounds as catalysts has been disclosed. Although this is a valuable contribution to the alkylation art, it still suffers from two glaring deficiencies. The first of these is that extremely high pressures, greater than 100 atmospheres and preferably greater than 150 atmospheres, are needed. Secondly, and perhaps more important, alkylation in reasonable yield by this method requires prohibitively long reaction periods of at least 16 hours. This makes the likelihood of commercial adaptation of this process extremely dubious.

An object of this invention is to provide a straightforward practicable means for alkylating organic compounds. A further object of this invention is to provide a process for the alkylation of nuclearly unsaturated compounds having alpha to a nuclear double bond a hydrogen-bearing saturated carbon atom. A further object is to provide a means for alkylating compounds of the above type under conditions milder than has heretofore been possible. Still another object is to provide a low pressure method of alkylating compounds of the type described above. An additional object is to provide a means for alkylating, in a practicably short reaction time, materials of the above type.

We have now made the unexpected discovery that compounds having alpha to a nuclear double bond a hydrogen-bearing saturated carbon atom can be alkylated with olefins, using organo-alkali metal compounds as catalysts at pressures below 90 atmospheres in total reaction times of the order of several minutes to a few hours. Alkylation occurs on a carbon atom alpha to a nuclear double bond and one, two or three hydrogen atoms on this carbon atom can be replaced by alkyl groups.

A preferred form of our invention comprises alkylation at pressures below 90 atmospheres of hydrogen-bearing alpha carbon atoms in compounds of the alkyl benzene series, such as toluene, ethyl benzene, isopropylbenzene and the like, with an olefin as the alkylating agent and an organo-alkali metal catalyst.

Another preferred form of our invention comprises the alkylation with an olefin in the presence of an organo-alkali metal catalyst on a hydrogen-bearing carbon atom alpha to a nuclear double bond, of an unsaturated alicyclic compound. In this preferred embodiment alkylation can be either nuclear or extranuclear.

In practicing our invention a carbocyclic compound of the class described is reacted with an olefin alkylating agent of the class described in the presence of an organo-alkali metal compound, at pressures below 90 atmospheres. The carbocyclic compound is rapidly and smoothly alkylated on the carbon atom indicated above, with formation of products in which at least one hydrogen on the indicated alpha carbon atom is replaced with the alkyl group derived from the alkylating agent. In carbocyclic compounds having more than one hydrogen on the susceptible carbon atom, and in carbocyclic compounds containing more than one such carbon atom, any or all of the possible products can be obtained. Control of the extent and type of alkylation is achieved by variation in reaction conditions and proportions of reactants.

Our invention relates to the production of products useful as chemical intermediates, as solvents, as constituents of blended fuels, etc. In many instances our process makes possible the preparation of compounds which cannot be obtained in a pure state by any other known method.

Generally the material to be alkylated comprises a carbocyclic compound such as an aromatic or alicyclic compound having a saturated carbon atom containing at least one hydrogen atom, said saturated carbon atom being bonded to a nuclear carbon atom which in turn is doubly bonded to a second nuclear carbon atom. The carbon atom to be alkylated can be either cyclic or acyclic in its bonding.

Typical compounds in which the carbon atom alkylated is cyclic comprise alicyclic and hydroaromatic compounds. Typical examples of this embodiment include cyclohexene, 1 - cyclohexylcyclohexene, cyclopentene, tetralin, hydrindene, 1-tert-butylcyclohexene, 1-phenylcyclohexene, 2-phenylcyclohexene, 4-methylcyclopentene, 4-ethylcyclopentene and the like.

Aromatic compounds, such as toluene, diphenylmethane, n-butylbenzene, ethylbenzene, n-propylbenzene, i-propylbenzene, sec-butylbenzene, di-n-propylbenzenes, n-dodecylbenzene, xylene, trimethylbenzenes, alpha-methylnaphthalene and the like alkylate on an acyclic carbon atom alpha to an aromatic nucleus.

Alicyclic compounds having substituent groups in a doubly bonded nuclear carbon atom can alkylate on either an acyclic or cyclic carbon atom or both. Examples of this type of compound include 1-methylcyclohexene-1, 1-ethylcyclohexene-1, 1,2-dimethylcyclohexene, 5-methyl-1,2,3,4-tetrahydronaphthalene, 5-n-propyl-1,2,3,4-tetrahydronaphthalene, 1-methylcyclopentene, 5-methylhydrindene, 1,2-dimethylcyclopentene and the like.

In compounds having two or more hydrogen-bearing saturated carbon atoms alpha to a nuclear double bond, in which the alpha carbon atoms are attached to a different number of hydrogen atoms, alkylation will preferably occur first on the carbon atom containing the greater number of hydrogen atoms. For example, in p-cymene, the methyl group is alkylated before the alpha carbon atom of the isopropyl group. Other examples of this type compound include methylethylbenzenes, dimethylethylbenzenes, methylpropylbenzenes, dimethylpropylbenzenes, 1-methylcyclohexene and the like.

Other examples of typical materials which can be alkylated according to our invention include the isomeric diethylbenzenes, 9,10-dihydrophenanthrene, 2-phenyldodecane, p-methyl-tert-butylbenzene, and the like.

As the alkylating agent any non-conjugated olefin is satisfactory. Preferably we employ acyclic monoolefins of 12 or less carbon atoms. Examples of our preferred alkylating agents are ethylene, propylene, butene-1, butene-2, pentene-1, pentene-2, hexene-1, hexene-2, hexene-3, the various acyclic heptenes, octenes, nonenes, decenes, undecenes, dodecenes, isobutylene, 3-methylheptene-1, 2-ethylpentene-1, 3-methylhexene-3 and the like. An especially preferred olefin in our invention is ethylene.

In addition to these preferred olefins other olefinic materials such as cyclic olefins, non-conjugated polyolefins and monoolefins of more than 12 carbon atoms can also be employed. Typical examples include cyclohexene, cyclopentene, 1,4-cyclohexadiene, 1,5-hexadiene, 1,4-hexadiene, pentadecene-1, other pentadecenes and tetradecenes.

Thus, in carrying out our invention we react, for example, toluene with ethylene and obtain n-propyl benzene, 3-phenylpentane and 3-ethyl-3-phenylpentane. We can control our reaction conditions, as is shown below, to obtain any or all of these products. Similarly, xylenes, upon reaction with ethylene, yield n-propylmethylbenzenes, di-n-propylbenzenes, methyl-(3-amyl)-benzenes, methyl-tert-heptylbenzenes, di-(3-amyl)-benzenes and di-(tert-heptyl)-benzenes; isopropylbenzenes and ethylene yield tert-amylbenzenes; tetralin and ethylene yield 1-ethyl-1,2,3,4-tetrahydronaphthalene, 1,4-diethyl-1,2,3,4-tetrahydronaphthalene, 1,1,4-triethyl-1,2,3,4-tetrahydronaphthalene and 1,1,4,4-tetraethyl-1,2,3,4-tetrahydronaphthalene; cyclohexene with ethylene yields 3-ethylcyclohexene, 3,6-diethylcyclohexene, 3,3,6-triethylcyclohexene and 3,3,6,6-tetraethylcyclohexene; diphenylmethane yields diphenylethylmethane and diphenyldiethylethane; p-cymene yields p-isopropyl-n-propylbenezene, 3-(p-isopropylphenyl)-pentane, 3-(p-tert-amylphenyl)-pentane, p-isopropyl-tert-heptylbenzene and p-(tert-amyl)-tert-heptylbenzene; alpha-methylnaphthalene and ethylene yield alpha-n-propylnaphthalene, alpha-(3-amyl)-naphthalene and alpha-(tert-heptyl)-naphthalene. The pattern of alkylation of the other carbocyclic compounds of our invention with ethylene is similar to that illustrated in these examples.

Other examples of processes employing our invention include the reaction of toluene with propylene to produce isobutylbenzene and α,α-(diisopropyl)-toluene; alkylation of cyclohexene with cyclohexene to produce 3-cyclohexylcyclohexene and 3,6-dicyclohexylcyclohexene; and the reaction of cumene with isobutylene to produce 2,3,3-trimethyl-2-phenylbutane. The alkylation of other carbocyclics of our invention proceeds in a similar manner.

As catalysts in our invention organo-alkali metal compounds generally are acceptable. This includes hydrocarbo-alkali metal compounds, sodium derivatives of nitrogen heterocycles, sodium derivatives of tertiary amines and the like. Examples include alkali metal derivatives of toluene, of p-dimethylaniline, of quinoline, of acridine and the like. This includes organo compounds of sodium, potassium, lithium, cesium and rubidium. We prefer to use organo compounds of alkali metals of atomic weight higher than 7, particularly sodium and potassium. We prefer as catalyst to use hydrocarbo-alkali metal compounds. This includes alkyl-alkali metal compounds such as amyl sodium, butyl sodium, hexyl potassium and the like, aryl-alkali metal compounds such as phenyl sodium, p-tolyl potassium, phenyl lithium and the like and alkyl-aryl-alkali metal compounds such as benzyl potassium, benzyl sodium, cumyl sodium, and the like. Mixtures of organo-alkali compounds can be used with equally good results.

Since oxygen reacts destructively with our catalysts, it is preferable that the alkylation reaction be carried out in substantially oxygen-free surroundings, and that reactants employed should be low, preferably below about 0.5 per cent, in oxygen content. However, our catalysts are effective oxygen scavengers and can be employed in the presence of greater quantities of oxygen, if the catalyst is present in amount in excess of the quantity consumed by oxygen.

The amount of catalyst to be employed is dependent to some extent upon the pressure of operation. At higher pressures somewhat smaller amounts of catalyst can be used than are preferable at lower pressures. Generally the amount of catalyst used should be about 0.01 to 10 per cent by weight of the amount of carbocyclic compound used, with best results obtained when the amount of catalyst is between 0.1 and 5 per cent by weight of the amount of carbocyclic compound.

Our reaction is operable at temperatures ranging from about 0 to 350° C. For best results it is preferred to operate at temperatures in the range of about 100–200° C.

Our invention is operable over a pressure range varying from atmospheric pressure to 90 atmospheres. At atmospheric pressure our reaction rates are rather slow so that we generally prefer to operate above about 15 atmospheres.

Our process is equally applicable to the alkylation of mixtures of carbocyclic compounds with olefins, and to the alkylation of carbocyclic compounds with mixtures of olefins, and to alkylation of mixtures of carbocyclic compounds with mixtures of olefins. In these cases, mixtures of products, which can be separated if desired by customary means, such as fractionation, are obtained.

The ratio of alkylating agent to carbocyclic compound can be varied over a wide range. Usually it is preferable to employ an excess over the stoichiometric amount of alkylating agent, but in some cases, as when monoalkylation of a carbocyclic compound capable of polyalkylation is desired, it may be preferable to operate with a stoichiometric deficiency of alkylating agent.

Although we prefer to alkylate a substantially undiluted carbocyclic compound with a substantially undiluted alkylating agent, it is within the scope of our invention to conduct our reaction with either or both of our reactants dissolved in a solvent. The solvent should be one which is inert to the alkylation reaction and which is substantially inert to attack by an alkali metal hydride. Paraffins, cycloparaffins, and aromatics containing no hydrogen-bearing carbon atoms alpha to an aromatic nucleus are examples of suitable solvent types. Specific examples include n-octane, iso-octane, cyclohexane, benzene, tert-amylbenzene and tert-heptylbenzenes. Also one or more of the reaction products can be employed as the solvent.

In commercial operation, it is particularly attractive to conduct our process in a continuous manner. This can be done by a variety of techniques, such as passing the reactants, either in the liquid or vapor state, or in mixed liquid-vapor state, over a fixed bed of catalyst, either substantially pure or admixed with an inert carrier. The product stream can be purified by distillation in a continuous fractionation column. Alternately, the liquid or liquid-vapor reaction can be carried out in the presence of a suspended catalyst which is transported through the reaction zone by the velocity of liquid reactants and products. In the vapor-phase reaction, the fluidized catalyst bed technique can be utilized; these and other continuous modifications of our invention can be carried out either "once-through" or with recycle of reactants and products. In continuous and batch modifications of our invention, the reactants can be diluted with inert gases, such as propane, ethane, methane, nitrogen, helium, neon and the like.

The following examples will serve to further illustrate the scope and benefits of our invention.

Example I

A pressure autoclave having a removable cap for charging and discharging liquids and solids, equipped with a plurality of gas inlet and outlet lines, thermocouples, and pressure gauges and fitted with a mechanical agitator was flushed with nitrogen and charged with 955 parts of toluene and 57 parts of benzyl sodium. The autoclave was closed, heated to 125° C. and pressured to 34 atmospheres with ethylene. The ratio of ethylene to toluene employed was approximately 0.4 to 1 by weight. While maintaining the temperature at 125° C. and maintaining the pressure in the range 20–34 atmospheres by occasional re-pressuring with ethylene, the reaction was stirred for 2.5 hours. At the end of this time the autoclave was permitted to cool to room temperature, vented, and the catalyst remaining destroyed with a mixture of ethanol and water. The organic layer was washed with water, dried and distilled through a helices-packed fractionating column at atmospheric pressure. After obtaining a fraction of 85 parts of unreacted toluene a fraction of 584 parts (47 per cent yield) of n-propylbenzene, boiling point 157–157.5° C./745 mm., refractive index $n_D^{20}$ 1.4911 and specific gravity $a_4^{20}$ 0.860 was obtained. Further fractionation led to 478 parts (33 per cent) of 3-phenylpentane, boiling point 186° C./745 mm., refractive index $n_D^{20}$ 1.4883, specific gravity 0.861.

Thus, at a pressure as low as 20 atmospheres and a reaction time of only 2.5 hours together with a relatively low temperature, the yield of alkylated toluene was far better than heretofore deemed possible when using organo-alkali metal catalysts.

Results obtained when alkylating toluene with ethylene under varying conditions are illustrated in the following table. The results of Example I are repeated for comparison. It is to be noted that all three of the possible alkylation products can be produced.

| Example | Pressure, atm. | Temp., ° C. | Reaction time, hrs. | Yield, percent, based on toluene charged | | |
|---|---|---|---|---|---|---|
| | | | | n-propyl-benzene | 3 phenyl-pentane | tert-heptyl-benzene |
| I | 20–34 | 125 | 2.5 | 47 | 33 | |
| II | 6.8 | 120–125 | 4.5 | 31 | | |
| III | 6.6–40 | 125–165 | 1.75 | 14.5 | 64 | 2.2 |
| IV | 25 | 125 | 4 | 40.2 | 10.4 | |
| V | 6.8–34 | 120–125 | 1.25 | 37.7 | 9 | |

When equipment having better heat-removal characteristics is used, the reaction time is considerably less than those indicated above, in some cases being as low as only twenty minutes.

When this procedure is carried out at temperatures as low as 0° C. and as high as 350° C. satisfactory results are obtained. Other organo-alkali metal compounds such as organo potassium and organo lithium compounds can be used in this procedure with equally beneficial results. Other olefins such as butene-2, hexene-1, dodecene-1 and the like give good yields of 2-benzylbutane, 2-benzylhexane, and 2-benzyldodecane, respectively, when used in place of the ethylene of the above procedure. In the case of hexene-1 and dodecene-1, however, the olefin is introduced to the pressure vessel as a liquid.

When the process of Example I is carried out with sec-butylbenzene, α-isopropylnaphthalene, 1-methyl-1,2,3,4-tetrahydronaphthalene, 1,4-dimethyl-1,2,3,4-tetrahydronaphthalene, and diisopropylbenzene as the carbocyclic compound the principal products of alkylation are 3-phenyl-3-methylpentane, alpha-(tert-amyl)-naphthalene, 1-methyl-4-ethyl-1,2,3,4-tetrahydronaphthalene, 1,4-dimethyl-1-ethyl-1,2,3,4-tetrahydronaphthalene and p-(tert-amyl)-isopropylbenzene, respectively. In the case of 1-methyl-1,2,3,4-tetrahydronaphthalene minor proportions of 1 - methyl - 1 - ethyl-1,2,3,4-tetrayhdronaphthalene, 1-methyl-1,4-diethyl-1,2,3,4-tetrahydronaphthalene and 1-methyl-1,4,4-triethyl-1,2,3,4-tetrahydronaphthalene will also be obtained. In the case of 1,4-dimethyl-1,2,3,4-tetrahydronaphthalene some 1,4-dimethyl-1,4-diethyl-1,2,3,4-tetrahydronaphthalene will be obtained, and with diisopropylbenzene minor amounts of di-(tetrt-amyl)-benzene will be produced. These minor reaction products are recovered after distillation of the primary product.

Example VI

Using essentially the procedure of Example I, toluene was ethylated with ethylene in the presence of benzyl potassium as a catalyst. The reaction conditions were: temperature 125° C., pressure 20–34 atmospheres, time 2.33 hours. The products were n-propyl benzene in 14.6 per cent yield and 3-phenyl pentane in 60.5 per cent yield.

Example VII

Using essentially the procedure of Example I, 862 parts of cumene was alkylated with ethylene in the presence of 70 parts of cumyl sodium catalyst. The reaction conditions were: temperature 130–170° C., pressure 20–38 atmospheres, time 2.67 hours. A 17 per cent yield of tert-amyl benzene, boiling point 188.5° C./737 mm., refractive index $n_D^{20}$ 1.4970, specific gravity $d_4^{20}$ 0.875, was obtained.

Example VIII

Using essentially the procedure of Example VII, cumene was alkylated with ethylene in the presence of cumyl sodium catalyst. Reaction conditions were: temperature 140° C., pressure 30–41 atmospheres, reaction time 1.5 hours. A 34 per cent yield of tert-amyl benzene was obtained.

Example IX

Cyclohexene (530 parts) was alkylated with ethylene in the presence of 47 parts of amyl sodium catalyst. The reaction conditions were: temperature 130–200° C., pressure 27 atmospheres, reaction time 1.67 hours. A 9.6 per cent yield of 3-ethylcyclohexene, boiling point 132.5–135.0° C./740 mm., refractive index $n_D^{20}$ 1.4550, was obtained.

Example X

A mixture of trimethyl benzenes (200 parts) was alkylated with ethylene in the presence of 20 parts of dimethyl benzyl sodium at 130° C. and atmospheric pressure for 10 hours. The alkylation products comprised a mixture of dimethyl n-propyl benzenes, boiling at 202–210° C./745 mm.

Example XI

Toluene (600 parts) was alkylated with propylene in the presence of benzyl sodium catalyst (54 parts) under the following reaction conditions: temperature 170–190° C., pressure 37–55 atmoshperes, reaction time 2.75 hours. A yield of 496 parts isobutyl benzene, boiling at 170.5–171° C., was obtained.

The procedures of Examples I through XI can be repeated with any of our reactants and catalysts with satisfactory results. Best results are obtained with the preferred reactants and catalysts indicated above; namely, carbocyclic hydrocarbons, acyclic monoolefins of 12 or less carbon atoms, and hydrocarbo-alkali metal catalysts.

We claim:

1. In a process for alkylating with a stoichiometric excess of a non-conjugated olefin a hydrogen-bearing saturated carbon atom, alpha to a doubly bonded nuclear carbon in a carbocyclic compound, the improvement which comprises conducting said process at a temperature between 0° C. and 350° C. for a reaction time between about 20 minutes and about 4.5 hours and under a pressure between about 6.6 and 55 atmospheres, said carbocyclic compound and said olefin being substantially undiluted with unreactive materials and having an oxygen content below about 0.5 per cent, in the presence of a hydrocarbo-alkali metal catalyst whose alkali metal has an atomic weight greater than 7 and in amount between about 0.01 and about 10 per cent by weight of said carbocyclic compound, in an initial reaction medium consisting essentially of said carbocyclic compound, said olefin and said catalyst.

2. A low pressure, high reaction rate process for the alkylation of a hydrogen-bearing saturated carbon atom, alpha to a doubly bonded nuclear carbon atom in a carbocyclic hydrocarbon under conditions in which alkylation of said alpha carbon atom constitutes the major reaction, said process consisting essentially of reacting said hydrocarbon at a temperature between 0° C. and 350° C. for a reaction time between about 20 minutes and about 4.5 hours and under a pressure between about 6.6 and 55 atmospheres with a stoichiometric excess of a non-conjugated olefin, said hydrocarbon and said olefin being substantially undiluted with unreactive materials and having an oxygen content below about 0.5 per cent, in the presence of a hydrocarbo-alkali metal catalyst whose alkali metal has an atomic weight greater than 7 and in an amount between about 0.01 and about 10 percent by weight of said hydrocarbon, in an initial reaction medium consisting essentially of said hydrocarbon, said olefin, and said catalyst.

3. Process of claim 2 in which said carbocyclic hydrocarbon is an alkyl benzene.

4. Process of claim 2 in which the olefin is an acyclic monoolefin of up to 12 carbon atoms.

5. Process of claim 2 carried out at a temperature of 100–200° C.

6. Process of claim 2 in which the alkali metal is sodium.

7. A low pressure, high reaction rate process for the ethylation of toluene under conditions in which the ethylation of toluene on the alpha carbon atom constitutes the major reaction, said process consisting essentially of reacting toluene at a temperature between 100° C. and 200° C. for a reaction time between about 20 minutes and about 4.5 hours and under a pressure between about 6.6 and 40 atmospheres with a stoichimetric excess of ethylene, said toluene and said ethylene being substantially undiluted with unreactive materials and having an oxygen content below about 0.5 per cent, in the presence of benzyl sodium in an amount between about 0.01 and about 10 per cent by weight of said toluene, in an initial reaction medium consisting essentially of toluene, ethylene, and benzyl sodium.

8. A process which comprises reacting toluene with a stoichiometric excess of ethylene in the presence of benzyl sodium as a catalyst in amount of substantially 57 parts of benzyl sodium per 955 parts toluene at a temperature of substantially 125° C. and a pressure of substantially 20 to 34 atmospheres for a reaction time of substantially 2.5 hours, said reactants being substantially undiluted with unreactive materials and having an oxygen content below about 0.5 per cent, in an initial reaction medium consisting essentially of toluene, ethylene, and benzyl sodium.

9. A process which comprises reacting toluene with a stoichiometric excess of ethylene in the presence of benzyl potassium as a catalyst in amount of substantially 57 parts of benzyl potassium per 955 parts toluene at a temperature of substantially 125° C. and a pressure of substantially 20 to 34 atmospheres for a reaction time of substantially 2.33 hours, said reactants being substantially undiluted with unreactive materials and having an oxygen content below about 0.5 per cent, in an initial reaction medium consisting essentially of toluene, ethylene, and benzyl potassium.

References Cited in the file of this patent

UNITED STATES PATENTS

| | | |
|---|---|---|
| 2,448,641 | Whitman | Sept. 7, 1948 |
| 2,548,803 | Little | Apr. 10, 1951 |
| 2,670,390 | Pines | Feb. 23, 1954 |